US012654798B2

(12) United States Patent
Carlin et al.

(10) Patent No.: US 12,654,798 B2
(45) Date of Patent: Jun. 16, 2026

(54) VEHICLE ENGINE THERMAL MANAGEMENT BY PRECISION COOLING USING SERIES FLOW-TYPE COOLING SYSTEM

(71) Applicant: Harley-Davidson Motor Company, INC., Milwaukee, WI (US)

(72) Inventors: Michael Carlin, Milwaukee, WI (US); Matt Pavlat, Milwaukee, WI (US); Johann Voges, Milwaukee, WI (US); Robert Brummond, Milwaukee, WI (US); Anthony Coffey, Milwaukee, WI (US)

(73) Assignee: HARLEY-DAVIDSON MOTOR COMPANY, INC., Milwaukee, WI (US)

( * ) Notice: Subject to any disclaimer, the term of this patent is extended or adjusted under 35 U.S.C. 154(b) by 424 days.

(21) Appl. No.: 18/352,771

(22) Filed: Jul. 14, 2023

(65) Prior Publication Data

US 2024/0359762 A1 Oct. 31, 2024

Related U.S. Application Data

(60) Provisional application No. 63/498,172, filed on Apr. 25, 2023.

(51) Int. Cl.
B62J 41/00 (2020.01)
B62M 7/02 (2006.01)

(52) U.S. Cl.
CPC ................ B62J 41/00 (2020.02); B62M 7/02 (2013.01)

(58) Field of Classification Search
CPC ............................ F01P 2003/025; B62M 7/02
USPC ......................................................... 180/229
See application file for complete search history.

(56) References Cited

U.S. PATENT DOCUMENTS

| | | | | |
|---|---|---|---|---|
| 7,367,293 B2 * | 5/2008 | Takeuchi | ................... | F01P 9/04 |
| | | | | 123/41.57 |
| 7,481,186 B2 * | 1/2009 | Takahashi | ................ | F01P 11/04 |
| | | | | 123/198 R |
| 8,256,386 B2 * | 9/2012 | Watanabe | .............. | B62K 11/04 |
| | | | | 123/41.86 |
| 8,307,791 B2 * | 11/2012 | Sugiura | ..................... | F01P 3/02 |
| | | | | 123/41.62 |
| 2011/0114044 A1 * | 5/2011 | Dees | ......................... | F02F 1/40 |
| | | | | 123/193.5 |
| 2018/0347738 A1 * | 12/2018 | Zhang | ..................... | F16L 33/01 |

* cited by examiner

*Primary Examiner* — Valentin Neacsu
*Assistant Examiner* — Hosam Shabara
(74) *Attorney, Agent, or Firm* — Jordan IP Law, LLC

(57) ABSTRACT

An example liquid cooling system for an internal combustion engine (ICE) of a vehicle, a vehicle having such a liquid cooling system, a cooling circuit for such a liquid cooling system, a method of cooling a vehicle engine. The liquid cooling system having a cooling circuit with a series flow structural configuration that provides precise cooling to the critical hot zones of the cylinder heads.

20 Claims, 10 Drawing Sheets

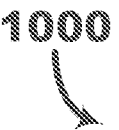

1000

Arrange series flow cooling circuit in gap between rear
exhaust port legs
1002

Circulate cooling medium through series flow cooling
circuit to capture heat from rear cylinder head temporally
before capturing heat from front cylinder head
1004

FIG. 10

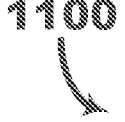

1100

Arrange serpentine-shaped, series flow cooling circuit in
gap between front exhaust port legs of front cylinder and
gap between rear exhaust port legs of rear cylinder
1102

Circulate cooling medium through series flow cooling
circuit to capture heat from rear cylinder head temporally
before capturing heat from front cylinder head
1104

FIG. 11

VEHICLE ENGINE THERMAL MANAGEMENT BY PRECISION COOLING USING SERIES FLOW-TYPE COOLING SYSTEM

TECHNICAL FIELD

One or more embodiments relate generally to a liquid cooling system for an internal combustion engine (ICE) of a vehicle, a vehicle having such a liquid cooling system, and a cooling circuit for such a liquid cooling system, and a method of cooling a vehicle engine. The liquid cooling system includes a cooling circuit having a series flow structural configuration that provides precise cooling to the critical hot zones of the cylinder heads.

BACKGROUND

Vehicles such as motorcycles having a design that incorporates an ICE may utilize air or liquid to cool the cylinder heads of the ICE. Air cooling relies on air flow over/on heat transfer surfaces in order to cool the engine. Liquid cooling relies on flow of a cooling medium/coolant liquid (e.g., refrigerants, oil, etc.) within the engine to absorb heat, and use a heat exchanger (e.g., a radiator) to transfer the absorbed heat in the coolant liquid to the ambient environment.

BRIEF SUMMARY

In accordance with one or more embodiments, a liquid cooling system for a vehicle engine has a series flow structural configuration to provide enhanced thermal management of cylinder heads of the ICE. In this way, the cooling system facilitates enhanced engine performance during operation of the vehicle.

In accordance with one or more embodiments, an example liquid cooling system for a vehicle engine comprises one or more of the following: a coolant circuit including one or more cooling tubes fluidically connected in series to define a channel for circulation of a cooling medium to cool a front cylinder head and a rear cylinder head of the vehicle engine, the cooling tubes including a rear cylinder precision cooling tube having a serpentine shape that extends through a gap between a pair of rear exhaust ports of the rear cylinder head to thermally contact one or more heat exchange surfaces of the rear exhaust ports.

In accordance with the example liquid cooling system, the cooling medium comprises at least one of water, glycol, oil, and any combination thereof.

In accordance with the example liquid cooling system, the cooling medium comprises a mixture of water and glycol.

In accordance with the example liquid cooling system, the cooling medium comprises a mixture of water and glycol in a 1:1 ratio.

In accordance with the example liquid cooling system, the coolant circuit is configured to circulate the cooling medium to the rear cylinder head temporally before circulating the cooling medium to the front cylinder head.

In accordance with the example liquid cooling system, the serpentine shape of the rear cylinder precision cooling tube comprises a first zone configured to thermally contact one or more heat exchange surfaces of a first rear exhaust port of the rear exhaust ports.

In accordance with the example liquid cooling system, the serpentine shape of the rear cylinder precision cooling tube comprises a second zone oriented in an opposite direction than the first zone.

In accordance with the example liquid cooling system, the second zone is configured to thermally contact one or more heat exchange surfaces of a second rear exhaust port of the rear exhaust ports.

In accordance with the example liquid cooling system, the serpentine shape of the rear cylinder precision cooling tube comprises a third zone that extends between the first zone and the second zone and into the gap between the first rear exhaust port and the second rear exhaust port.

In accordance with the example liquid cooling system, the third zone is configured to thermally contact one or more heat exchange surfaces of the first rear exhaust port and the second rear exhaust port.

In accordance with one or more embodiments, an example vehicle comprises one or more of the following: a vehicle structure; a vehicle engine mounted on the vehicle structure, the vehicle engine including a front cylinder head of a front cylinder and a rear cylinder head of a rear cylinder having a pair of rear exhaust ports; and a liquid cooling system having a coolant circuit including one or more cooling tubes fluidically connected in series to define a channel for circulation of a cooling medium to cool the front cylinder head and the rear cylinder head, the cooling tubes including a rear cylinder precision cooling tube having a serpentine shape that extends through a gap between the rear exhaust ports to thermally contact one or more heat exchange surfaces of the rear exhaust ports.

In accordance with the example vehicle, the cooling medium comprises at least one of water, glycol, oil, and any combination thereof.

In accordance with the example vehicle, the coolant circuit is configured to circulate the cooling medium to the rear cylinder head temporally before circulating the cooling medium to the front cylinder head.

In accordance with the example vehicle, the serpentine shape of the rear cylinder precision cooling tube comprises a first zone configured to thermally contact one or more heat exchange surfaces of a first rear exhaust port of the rear exhaust ports.

In accordance with the example vehicle, the serpentine shape of the rear cylinder precision cooling tube comprises a second zone oriented in an opposite direction than the first zone.

In accordance with the example vehicle, the second zone is configured to thermally contact one or more heat exchange surfaces of a second rear exhaust port of the rear exhaust ports.

In accordance with the example vehicle, the serpentine shape of the rear cylinder precision cooling tube comprises a third zone that extends between the first zone and the second zone and into a gap between the first rear exhaust port and the second rear exhaust port.

In accordance with the example vehicle, the third zone configured to thermally contact one or more heat exchange surfaces of the first rear exhaust port and the second rear exhaust port.

In accordance with the example vehicle, a heat exchanger is center-mounted on the vehicle structure at a predetermined angle (from the vertical) and configured to transmit heated absorbed from the cooling medium to the ambient environment outside of the vehicle.

In accordance with the example vehicle, the predetermined angle is 21.1 degrees.

In accordance with the example vehicle, a pump is fluidically connected at one end thereof to the heat exchanger and an opposite end thereof to the rear cylinder precision cooling tube to drive the cooling medium to the rear cylinder head temporally before being circulated to the front cylinder head.

In accordance with one or more embodiments, an example coolant circuit for a liquid cooling system for a vehicle engine comprises one or more of the following: one or more cooling tubes fluidically connected in series to define a channel for circulation of a cooling medium to cool a front cylinder head and a rear cylinder head of the vehicle engine, the cooling tubes including a rear cylinder precision cooling tube having a serpentine shape that extends through a gap between a pair of rear exhaust ports of the rear cylinder head to thermally contact one or more heat exchange surfaces of the rear exhaust ports.

In accordance with the example coolant circuit, the cooling medium comprises at least one of water, glycol, oil, and any combination thereof.

In accordance with the example coolant circuit, the coolant circuit is configured to circulate the cooling medium to the rear cylinder head temporally before circulating the cooling medium to the front cylinder head.

In accordance with the example coolant circuit, the serpentine shape of the rear cylinder precision cooling tube comprises a first zone configured to thermally contact one or more heat exchange surfaces of a first rear exhaust port of the rear exhaust ports.

In accordance with the example coolant circuit, the serpentine shape of the rear cylinder precision cooling tube comprises a second zone oriented in an opposite direction than the first zone.

In accordance with the example coolant circuit, the second zone is configured to thermally contact one or more heat exchange surfaces of a second rear exhaust port of the rear exhaust ports.

In accordance with the example coolant circuit, the serpentine shape of the rear cylinder precision cooling tube comprises a third zone that extends between the first zone and the second zone and into the gap between the first rear exhaust port and the second rear exhaust port.

In accordance with the example coolant circuit, the third zone is configured to thermally contact one or more heat exchange surfaces of the first rear exhaust port and the second rear exhaust port.

In accordance with one or more embodiments, an example method of cooling a vehicle engine comprises one or more of the following: arranging a series flow cooling circuit in a gap between the legs of the rear exhaust port; and circulating (or causing to circulate) a cooling medium/coolant liquid through the series flow cooling circuit in order to capture heat from the rear cylinder head temporally before capturing heat from the front cylinder head.

In accordance with one or more embodiments, an example method of cooling a vehicle engine comprises one or more of the following: arranging a front serpentine-shaped region of a series flow cooling circuit in a gap between the legs of the front exhaust port and a rear serpentine-shaped region of the series flow cooling circuit in a gap between the legs of the rear exhaust port; and circulating (or causing to circulate) a cooling medium/coolant liquid through the series flow cooling circuit in order to capture heat from the rear cylinder head temporally before capturing heat from the front cylinder head. In that way, the series flow cooling circuit forms a fluid flow path that thermally contacts one or more heat exchange surfaces the rear cylinder head at the critical hot zone, which represents the area of cylinder head where the operating temperatures are highest.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

FIGS. 10 and 11 illustrate a schematic diagram of example methods of cooling a vehicle engine, in accordance with one or more embodiments shown and described herein.

DETAILED DESCRIPTION

Figure 1:
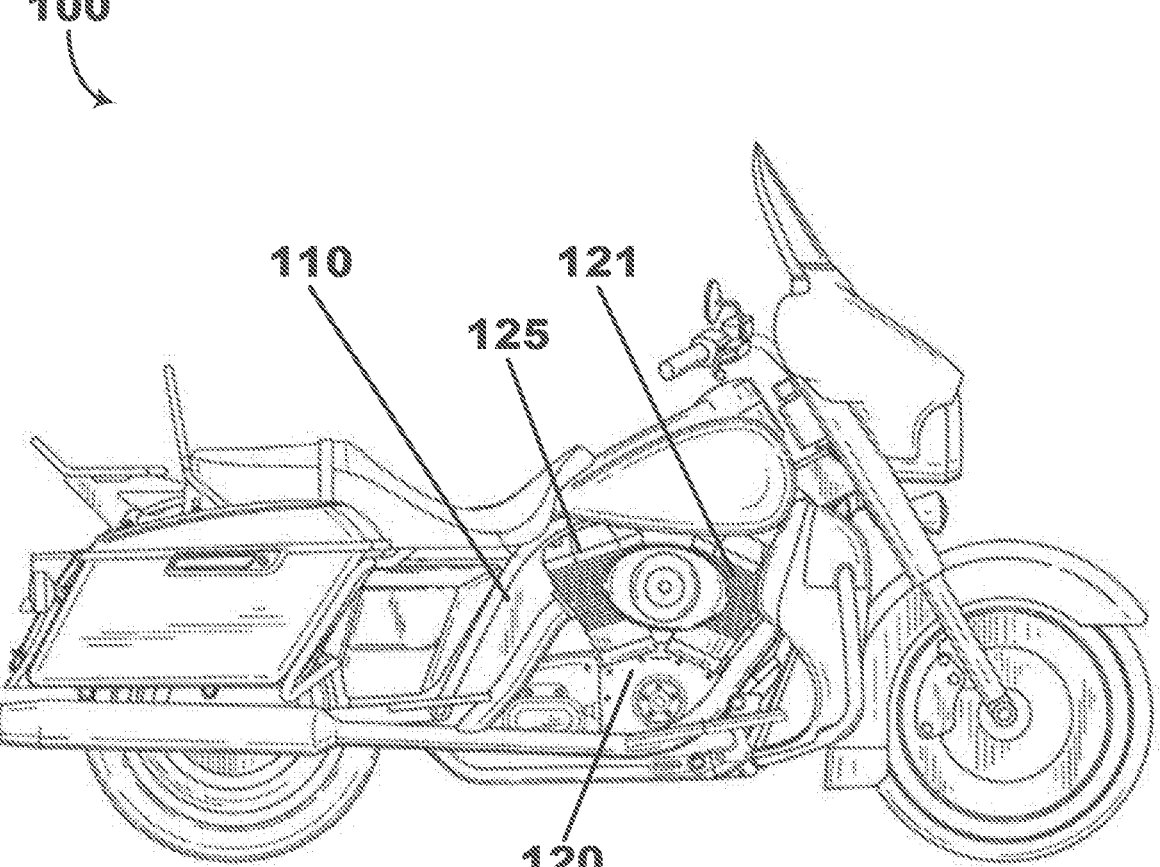
FIG. 1 illustrates an example vehicle, in accordance with one or more embodiments set forth, illustrated, and described herein.
Figure 2:
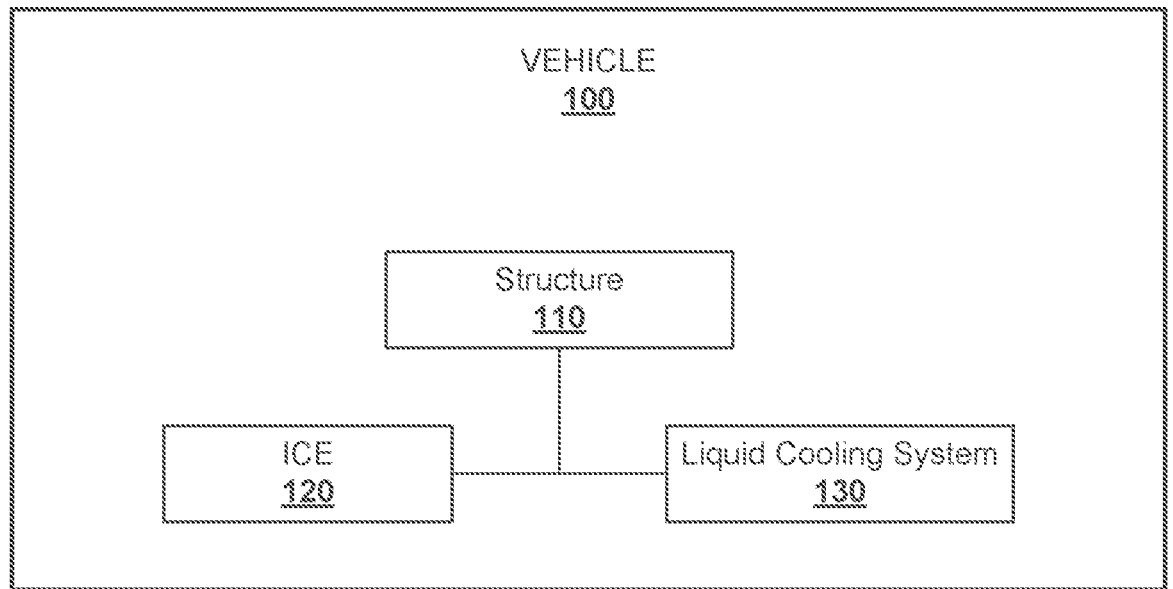
FIG. 2 illustrates an example block diagram of the example vehicle of FIG. 1.

Turning to the figures, in which FIGS. 1 and 2 illustrate a vehicle 100 having a vehicle structure 110 (e.g., chassis, frame, subframe, body, front/rear forks, etc.), in accordance with one or more embodiments. In accordance with one or more embodiments, a "vehicle" may be in reference to any form of motorized transport. In the illustrated embodiment of FIG. 1, the vehicle 100 comprises a two-wheeled vehicle such as a motorcycle. Embodiments, however, are not limited thereto, and thus, this disclosure contemplates the vehicle comprising a three-wheeled vehicle, a four-wheeled vehicle, or any suitable vehicle that falls within the spirit and scope of the principles of this disclosure.

In accordance with one or more embodiments, the vehicle 100 may comprise one or more operational elements. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1, or may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

Figure 3:
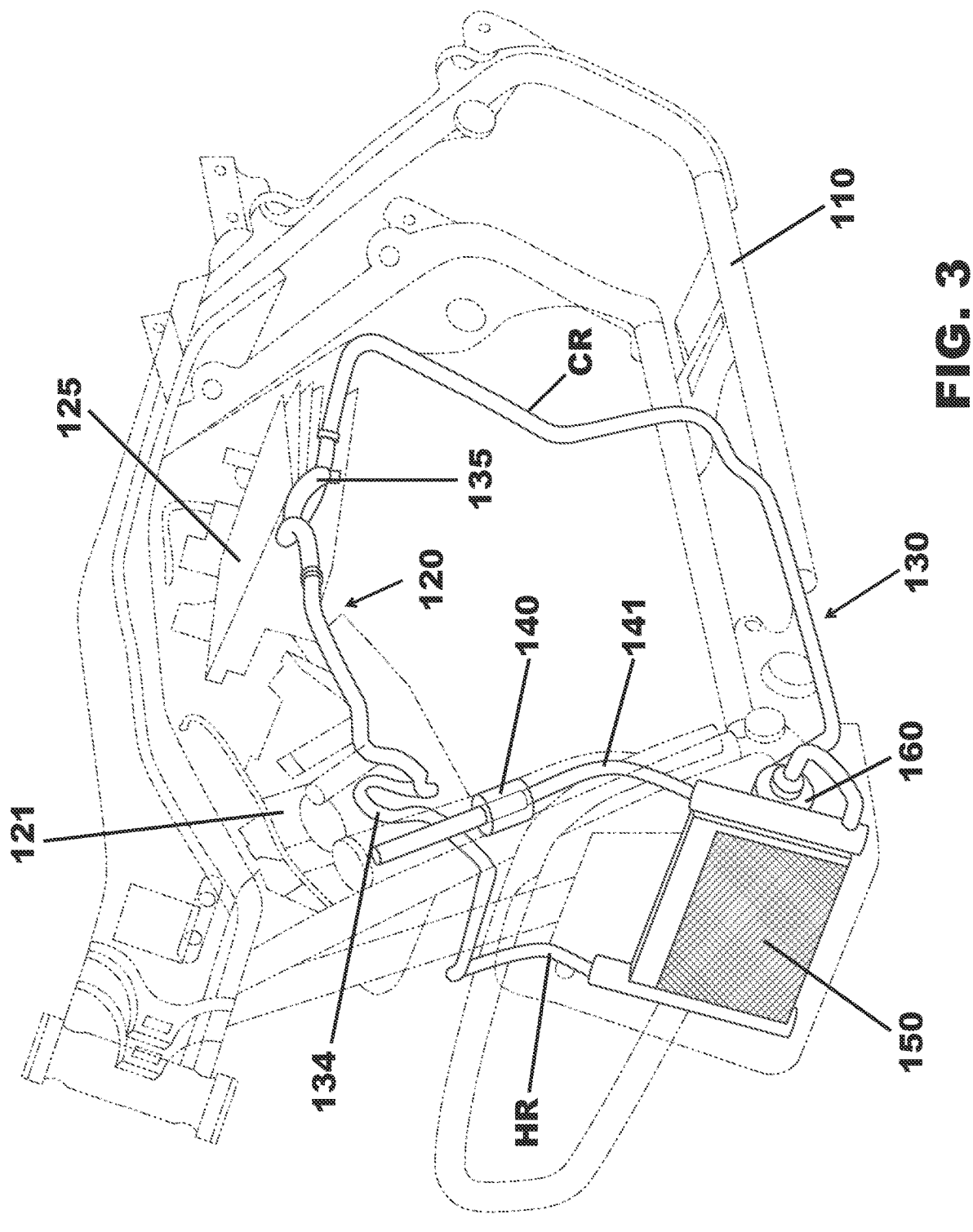
FIG. 3 illustrates an example coolant circuit of a liquid cooling system for providing precision cooling to an ICE of the example vehicle of FIG. 1.

In the illustrated embodiment of FIGS. 1 to 3, the vehicle 100 includes an ICE 120 operatively coupled to the vehicle structure 110. In a direction of travel of the vehicle 100, the ICE 120 includes a first or front cylinder 121 having a front cylinder head 122 with a pair of intake ports 123 and a pair of exhaust ports 124, and a second or rear cylinder 125 having a rear cylinder head 126 with a pair of intake ports 127 and a pair of exhaust ports 128. The front cylinder 121 and the rear cylinder 125 also include a reciprocating piston (not illustrated). The front cylinder head 122 includes a front intake valve (not illustrated) for controlling the flow of intake air through the combustion chamber of the front cylinder 121, and a front exhaust valve (not illustrated) for controlling the flow of exhaust air through the combustion chamber of the front cylinder 121. Likewise, the rear cylinder head 126 includes a rear intake valve (not illustrated) for controlling the flow of intake air through the combustion chamber of the rear cylinder 125, and a rear exhaust valve (not illustrated) for controlling the flow of exhaust air through the combustion chamber of the rear cylinder 125.

By virtue of the structural configuration of the ICE 120 and its mounting position on the vehicle structure 110, the front cylinder head 122 receives a greater amount of airflow from the ambient than the rear cylinder head 126. Accordingly, the front cylinder head 122 can be considered both air cooled (via ambient flow) and liquid cooled (via the liquid cooling system 130). By virtue of its position, the rear cylinder head 126 experiences greater heat during operation.

For an ICE having a four-valve head design, the critical hot zones of the exhaust port are generally located between the legs of the exhaust ports, and particularly, the inner surface of the legs of the exhaust ports. To address the technical problem of the heat zones between the legs of the exhaust ports, the vehicle 100 further comprises a liquid cooling system 130 that circulates a cooling medium/coolant liquid to thermally manage the ICE 120 by cooling (i.e., reducing its operating temperature) the ICE 120 through the removal of combustion heat from the front cylinder head 122 and the rear cylinder head 126 during operation of the vehicle 100. In accordance with one or more embodiments, the cooling medium comprises at least one of water, glycol, oil, and any combination thereof. In accordance with one or more embodiments, the cooling medium comprises a mixture of water and glycol. In accordance with one or more embodiments, the cooling medium comprises a mixture of water and glycol in a 1:1 ratio.

Figure 6:
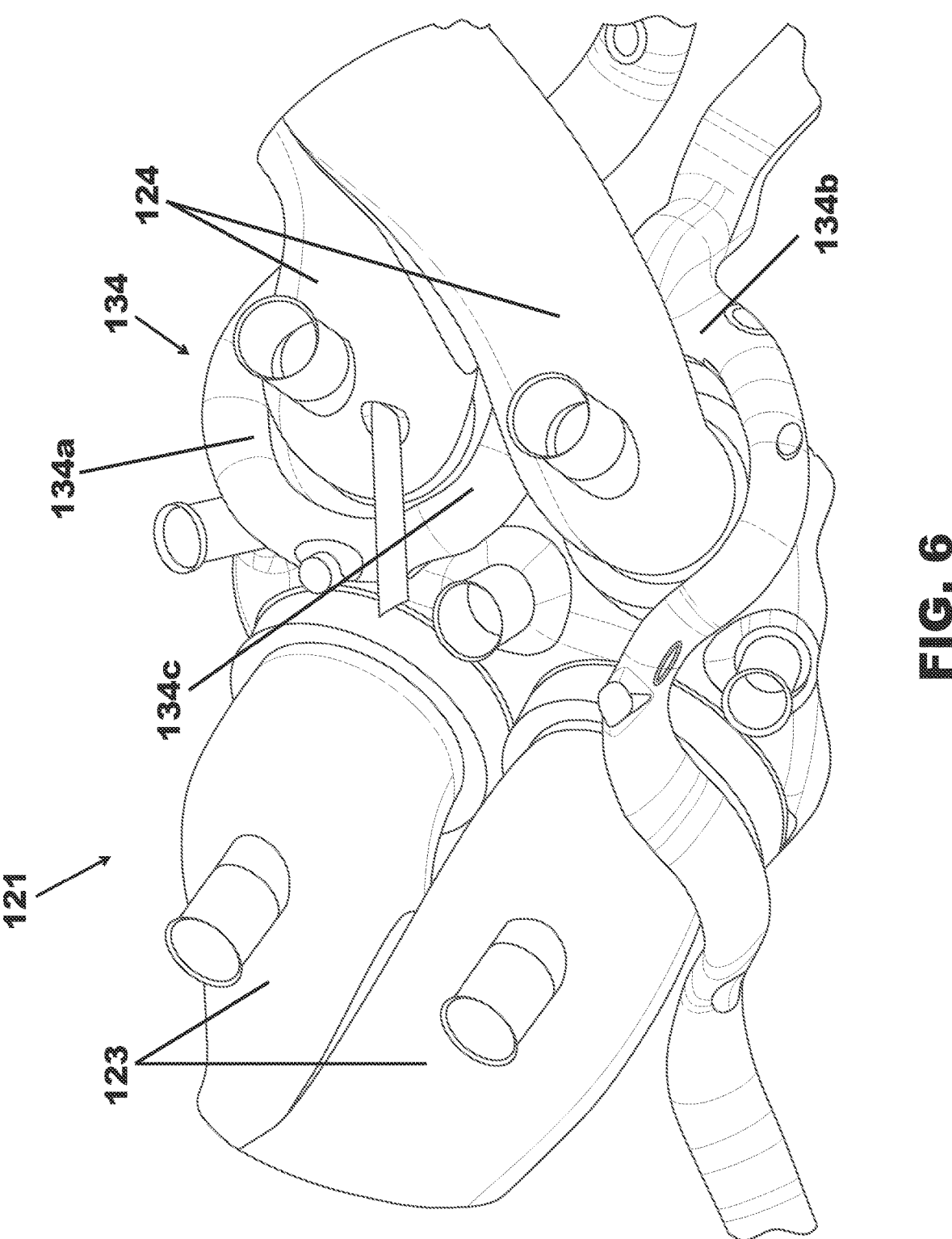
FIGS. 6 and 7 illustrates an example arrangement of the liquid cooling system for a cylinder head of the ICE.

As illustrated in FIGS. 2, 3, and 6, the liquid cooling system 130 comprises one or more cooling tubes that are fluidically connected in series. The cooling tubes comprise a front cylinder precision cooling tube 131, a rear cylinder precision cooling tube 132, and an intermediate transfer hose 133 to fluidically connect the front cylinder precision cooling tube 131 and the rear cylinder precision cooling tube 132. The front cylinder precision cooling tube 131 comprises a length of tubing defining a channel through which the cooling medium/coolant liquid flows or circulates. Although in the illustrated examples, the liquid cooling system 130 comprises a plurality of cooling tubes, embodiments are not limited thereto. This disclosure contemplates the liquid cooling system 130 comprising any suitable configuration that falls within the spirit and scope of the principles of this disclosure. For example, the liquid cooling system 130 may comprise a single, monolithic cooling tube that defines the coolant circuit for circulation or flow of the cooling medium/coolant liquid to cool the ICE 120.

In the illustrated example embodiment of FIG. 2, the cold region CR of the liquid cooling system 130 is located downstream of the radiator 150 (i.e., illustrated in FIG. 2 at the right of the coolant circuit), and transitions to the hot region located upstream of the radiator 150 (i.e., illustrated in FIG. 2 at the left of the coolant circuit). Going in an anti-clockwise direction, the flow of cooling medium/coolant liquid is driven by the liquid coolant pump 160 through the rear cylinder precision cooling tube 132, which provides precision cooling to the rear cylinder 125. The cooling medium/coolant liquid then flows from the rear cylinder precision cooling tube 132 to the front cylinder precision cooling tube 131 via the intermediate transfer hose 133, which provides precision cooling to the front cylinder 121. The cooling medium/coolant liquid then flows from the front cylinder precision cooling tube 131 for re-entry into the radiator 150, which is configured to be in thermal contact with the hot cooling medium/coolant liquid for purposes of reducing the temperature of the cooling medium/coolant liquid (water).

The front cylinder precision cooling tube 131 and the rear cylinder precision cooling tube 132 each comprises a length of tubing defining a channel through which the cooling medium/coolant liquid (is to flow. One section of the front cylinder precision cooling tube 131 and the rear cylinder precision cooling tube 132 comprises an S-core section 134, 135 formed having a serpentine-type configuration that extends between the exhaust port legs in a manner that provides precision cooling thereto. The serpentine shape of the S-core sections 134, 135 is advantageous insofar as it enables the liquid cooling system 130 to selectively extend into and provide precision cooling to the critical hot zones (i.e., between the exhaust port legs) of the ICE 120.

Figure 4:
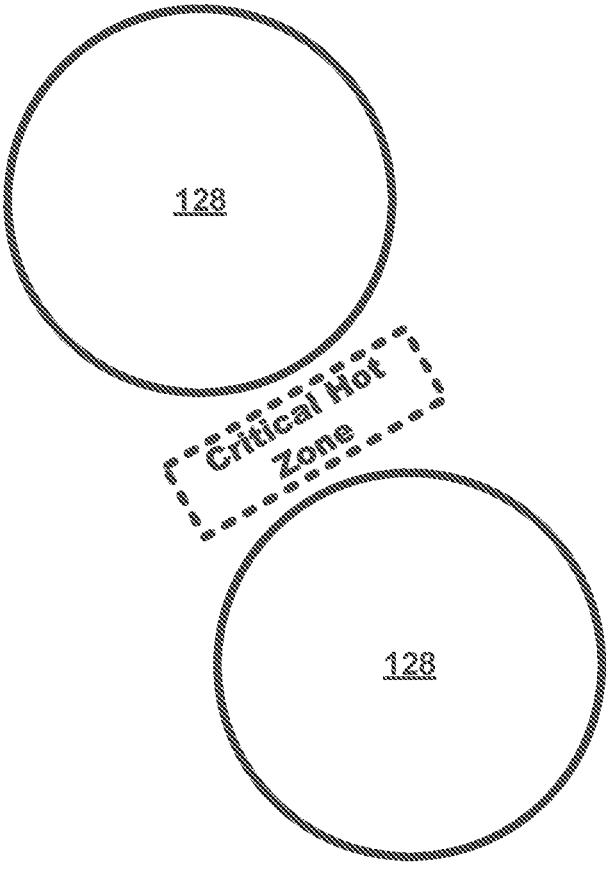
FIG. 4 illustrates a top view of the critical hot zone in a gap between the legs of the rear exhaust ports for a rear cylinder head of the ICE.
Figure 5:
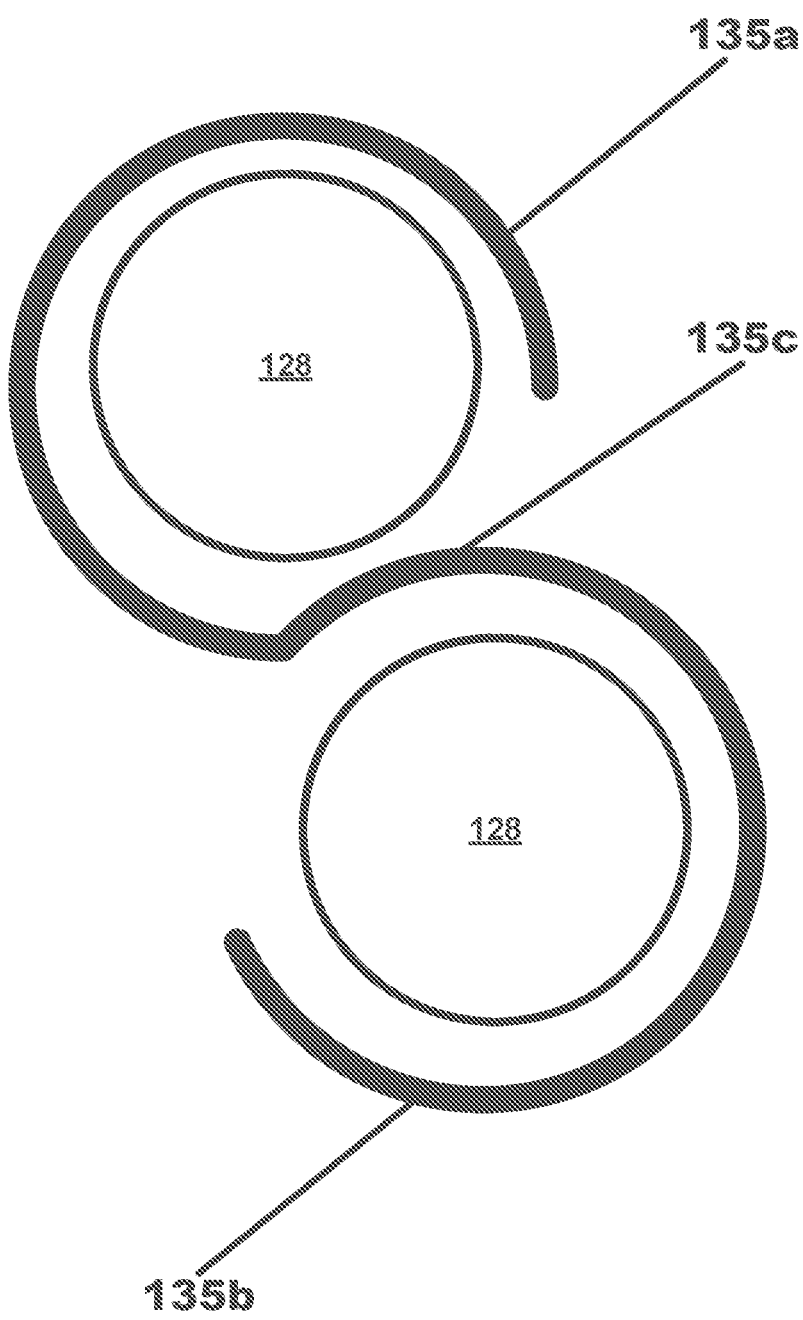
FIG. 5 illustrates a top view of an example arrangement of the liquid cooling system for the rear exhaust ports of FIG. 4.

As illustrated in FIGS. 4 and 5, in order to provide optimal thermal management to the critical hot zones of the front cylinder 121 and the rear cylinder 125, the S-core sections 134, 135 extend to target the critical hot zone located between the legs of the front exhaust ports 124 (of the front cylinder 121) and the rear exhaust ports 128 (of the rear cylinder 125). In that way, the structural configuration of the S-core sections 134, 135 provides precision cooling to the critical hot zones of the ICE 120 by drawing heat therefrom. In particular, the S-core sections 134, 135 respectively form a fluid flow path that is in thermal contact with one or more heat exchange surfaces of the front cylinder 121 and the rear cylinder 125 at the critical hot zone. The S-core sections 134, 135 are also arranged adjacent to the spark plugs, and thus, serve to thermally contact the spark plugs to draw heat therefrom. This results in higher NOx resistance of the ICE 120. As used herein, "thermal contact" means at least one surface of one structure or component captures the heat emitted by at least one surface of another structure or component, either heat radiation, conduction, and/or convection.

The S-core section 134 of the front cylinder precision cooling tube 131 includes three regions or zones 134a, 134b, and 134c which contribute to reducing the operating temperature of the ICE 120 and drawing heat away from the critical hot zone of the front cylinder 121.

The first zone 134a has an inner elbow formed by a generally concave configuration defines a flow channel that is in thermal contact with one or more heat exchange surfaces of one of the front exhaust ports 124.

The second zone 134b has an inner elbow oriented in an opposite direction than the inner elbow of the first zone 134a, and thus, redirects the flow of the cooling medium/coolant liquid. The inner elbow of the second zone 134b is formed by a generally concave configuration defines a flow channel that is in thermal contact with one or more heat exchange surfaces of the other one of the front exhaust ports 124.

The third zone 134c extends intermediate to or otherwise between the first zone 134a and the second zone 134b in a space or gap between the exhaust port legs of the front exhaust ports 124. In that way, the third zone 134c defines a flow channel which provides precision cooling to the critical hot zone of the front cylinder 121 by establishing thermal contact with one or more heat exchange surfaces of the front exhaust ports 124.

The S-core section 135 of the rear cylinder precision cooling tube 132 includes three regions or zones 135a, 135b, and 135c which also contribute to reducing the operating temperature of the ICE 120.

The first zone 135a has an inner elbow formed by a generally concave configuration defines a flow channel that is in thermal contact with one or more heat exchange surfaces of one of the rear exhaust ports 128.

The second zone 135b has an inner elbow oriented in an opposite direction than the inner elbow of the first zone 135a, and thus, redirects the flow of the cooling medium/coolant liquid. The inner elbow of the second zone 135b is formed by a generally concave configuration defines a flow channel that is in thermal contact with one or more heat exchange surfaces of the other one of the rear exhaust ports 128.

The third zone 135c extends intermediate to or otherwise between the first zone 135a and the second zone 135b in a space or gap between the exhaust port legs of the rear exhaust ports 128. In that way, the third zone 135c defines a flow channel which provides precision cooling to the critical hot zone of the rear cylinder 125 by establishing thermal contact with one or more heat exchange surfaces of the rear exhaust ports 128.

As illustrated in FIGS. 3 and 6, the liquid cooling system 130 further comprises a heat exchanger such as a radiator 150 that transmits the heated absorbed from the cooling medium/coolant liquid to the ambient environment outside of the vehicle 100. The radiator 150 is center-mounted at the front of the vehicle structure 110 and oriented at a predetermined angle relative to the vertical to further contribute to the enhanced thermal management of the ICE 120 provided by the liquid cooling system 130. In accordance with one or more embodiments, the predetermined angle is 21.1 degrees.

Figure 7:
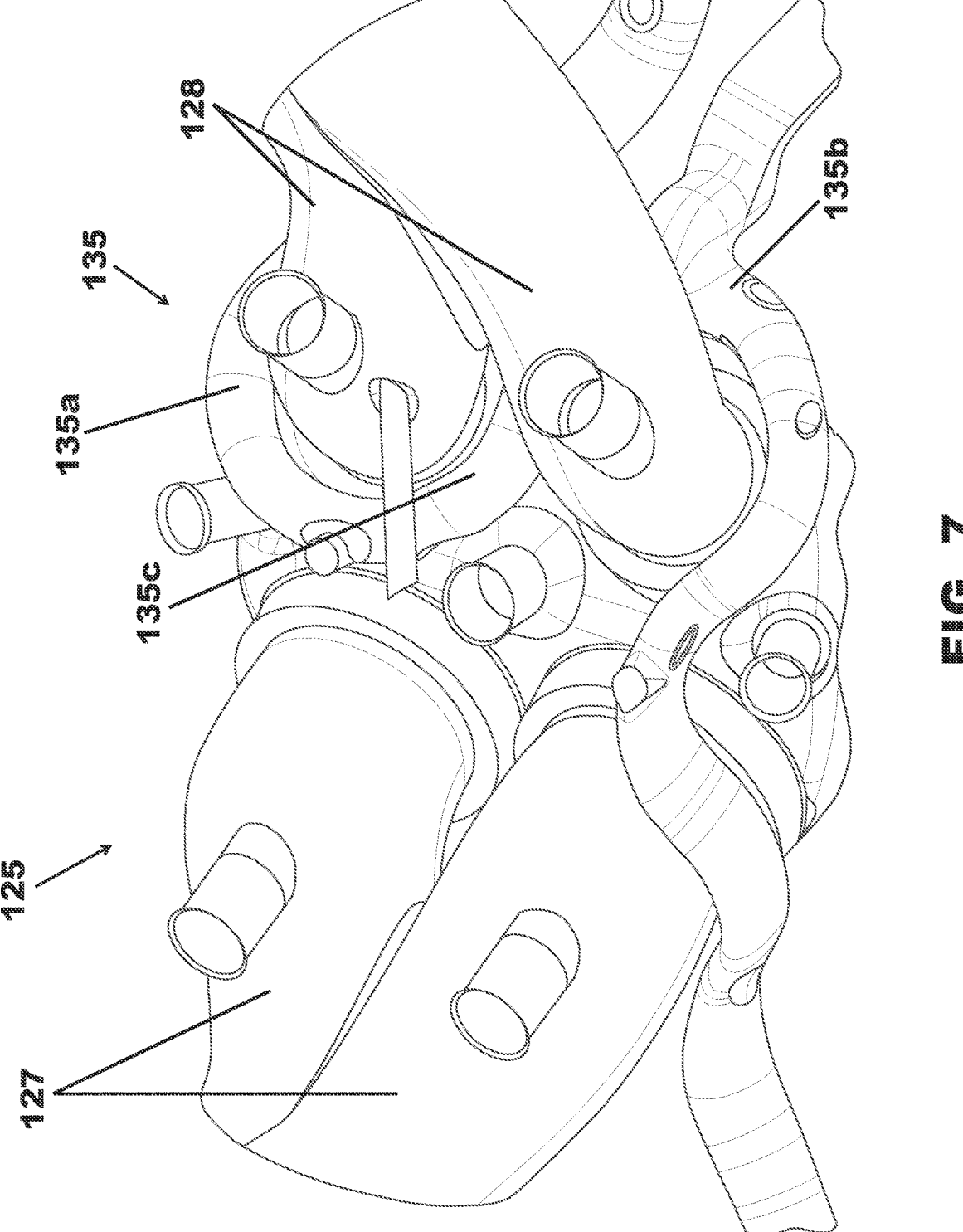
Figure 8:
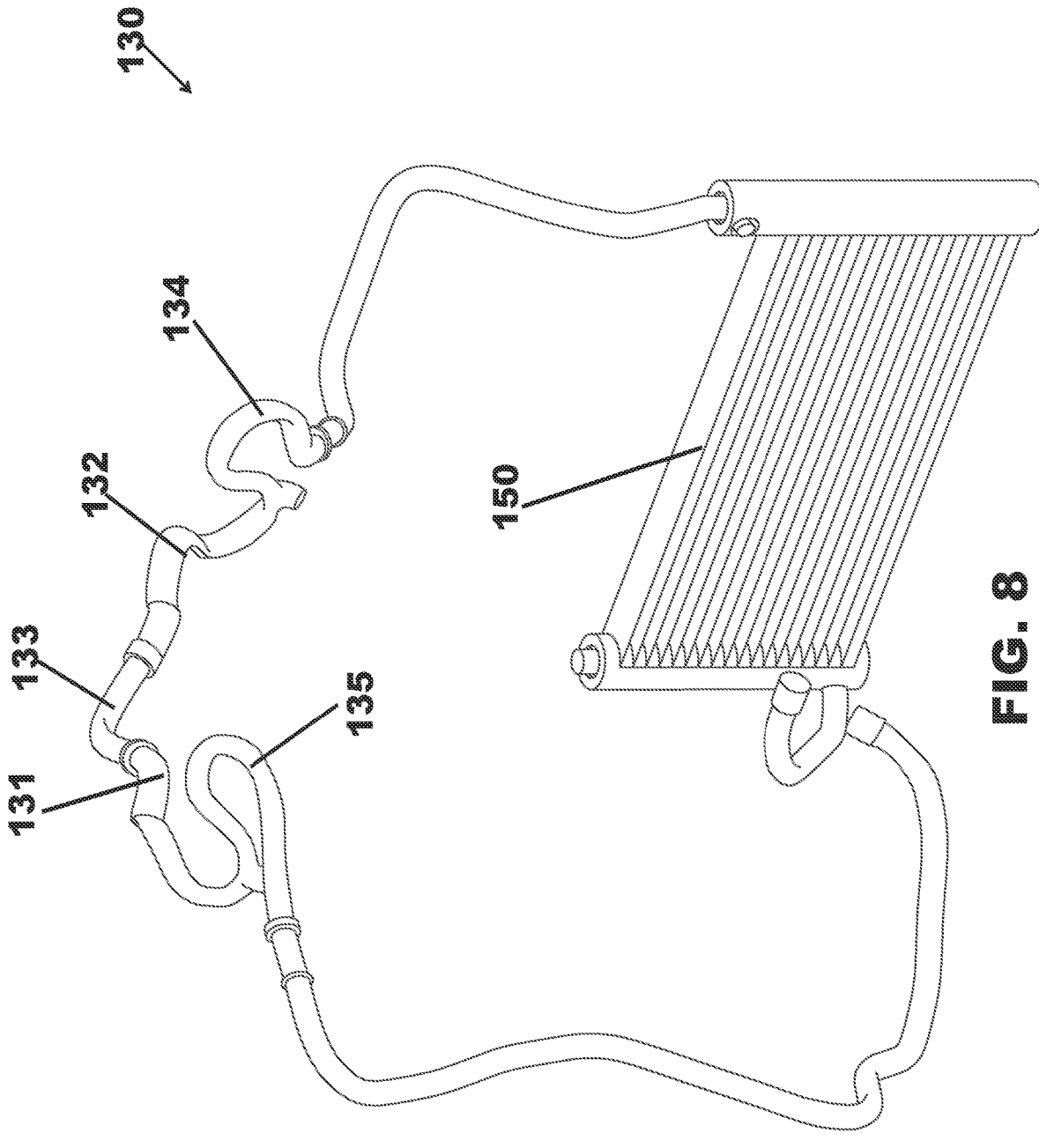
FIG. 8 illustrates the liquid/water cooling system without the liquid coolant pump.

As illustrated in FIGS. 3 and 7, a liquid coolant pump 160 is fluidically connected at one end thereof to the radiator 150 and an opposite end thereof to the rear cylinder precision cooling tube 132 to drive or otherwise circulate the cooling medium/coolant liquid in an anti-clockwise direction in order to capture heat from the rear cylinder head 125 temporally before capturing heat from the front cylinder head 121. A coolant bottle overflow apparatus 140 is fluidically connected to the radiator 150 via a coolant fill hose 141. The coolant bottle overflow apparatus 140 includes a pressurized region that is in fluidic communication with the pressurized liquid cooling system 130, and a non-pressurized region that is operable to facilitate receipt and discharge/removal of overflow cooling medium/coolant liquid during operation due to normal expansion/contraction of the cooling medium/coolant liquid in the pressurized liquid cooling system 130.

Figure 9:
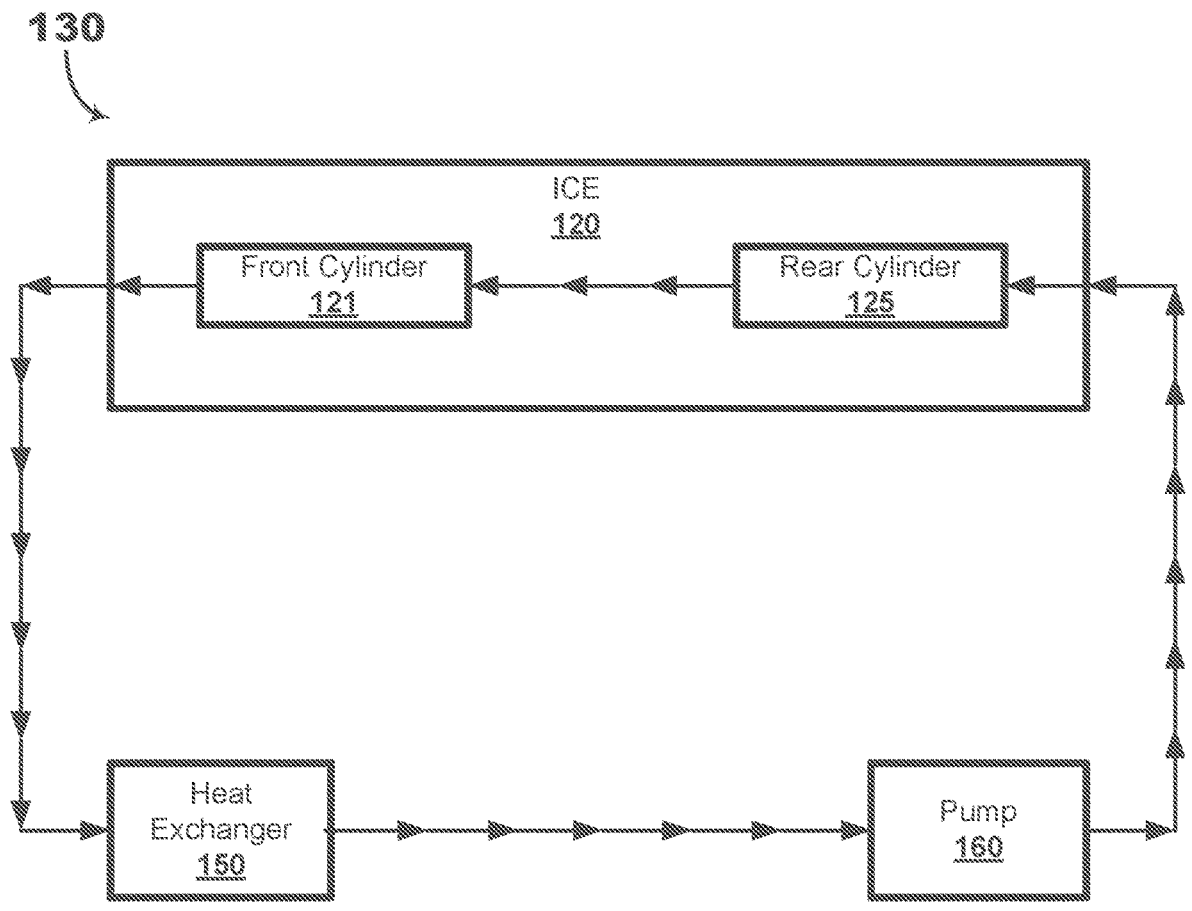
FIG. 9 illustrates a block diagram of the coolant circuit for the liquid cooling system.

In a driving direction of the vehicle 100, the rear cylinder head 126 is shielded at least by the front cylinder head 122. Thus, as illustrated in FIG. 9, the liquid cooling system 130 is configured to circulate the cooling medium/coolant liquid in manner that the cooling medium/coolant liquid that has exited the radiator 150 reaches the rear cylinder head 126 temporally before reaching the front cylinder head 122. By virtue of its mounting position, the front cylinder head 122 receives a greater amount (when compared to the rear cylinder head 126) of ambient air flow during operation of the vehicle 100. Circulating the cooling medium/coolant liquid to the rear cylinder head 126 temporally first achieves incremental gains in heat transfer via the cooling medium/coolant liquid. This impact is particularly noticed at very low operating speeds of the vehicle 100, when ambient air flow is minimal. Thus, the liquid cooling system 130 cools the rear cylinder head 126 temporally before the front cylinder head 122 because it generates the most heat (when compared to the front cylinder head 122) since it experiences less exposure to airflow during operation of the vehicle 100.

In the illustrated examples of FIGS. 10 and 11, a flowchart of methods 1000 and 1100 for cooling a vehicle engine.

In the illustrated example method 1000 of FIG. 10, illustrated process block 1002 includes arranging a series flow cooling circuit in a gap between the legs of the rear exhaust port.

The method 1000 may then proceed to illustrated process block 1004, which includes circulating (or causing to circulate) a cooling medium/coolant liquid through the series flow cooling circuit in order to capture heat from the rear cylinder head temporally before capturing heat from the front cylinder head. In that way, the series flow cooling circuit forms a fluid flow path that thermally contacts one or more heat exchange surfaces the rear cylinder head at the critical hot zone.

In the illustrated example method 1100 of FIG. 11, illustrated process block 1102 includes arranging a front serpentine-shaped region of a series flow cooling circuit in a gap between the legs of the front exhaust port and a rear serpentine-shaped region of the series flow cooling circuit in a gap between the legs of the rear exhaust port.

The method 1100 may then proceed to illustrated process block 1104, which includes circulating (or causing to circulate) a cooling medium/coolant liquid through the series flow cooling circuit in order to capture heat from the rear cylinder head temporally before capturing heat from the front cylinder head. In that way, the series flow cooling circuit forms a fluid flow path that thermally contacts one or more heat exchange surfaces the rear cylinder head at the critical hot zone.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

EXAMPLES

The disclosure further includes additional notes and examples, as set forth in the following clauses.

Clause 1. A coolant circuit for a vehicle engine having a front cylinder head of a front cylinder and a rear cylinder head of a rear cylinder, the cooling structure comprising: a coolant circuit defined at least partially by a front cylinder precision cooling tube through which a cooling medium/coolant liquid flows to provide precision cooling to the front cylinder head, and a rear cylinder precision cooling tube, fluidically connected to the front cylinder precision cooling tube, through which a cooling medium/coolant liquid flows to provide precision cooling to the rear cylinder head, the front cylinder precision cooling tube and the rear cylinder precision cooling tube being fluidically connected in series, wherein the front cylinder precision cooling tube, in a flow direction of the fluid circuit, is arranged downstream of the rear cylinder precision cooling tube in a manner such that the cooling medium/coolant liquid is circulated first to the rear cylinder head before flowing to the front cylinder head.

Clause 2. A coolant circuit for a vehicle engine having a front cylinder head of a front cylinder and a rear cylinder head of a rear cylinder, the cooling structure comprising: a fluid circuit defined at least partially by a front cylinder precision cooling tube through which a cooling medium/coolant liquid flows to provide precision cooling to the front cylinder head, and a rear cylinder precision cooling tube, fluidically connected to the front cylinder precision cooling tube, through which a cooling medium/coolant liquid flows to provide precision cooling to the rear cylinder head, the front cylinder precision cooling tube and the rear cylinder precision cooling tube being fluidically connected in series, wherein the front cylinder precision cooling tube has one section thereof formed having a serpentine shape that extends between exhaust port legs of the front cylinder to provide precision cooling thereto, wherein the rear cylinder precision cooling tube has one section thereof formed having a serpentine shape that extends between exhaust port legs of the rear cylinder to provide precision cooling thereto.

Clause 3. A coolant circuit for a vehicle engine having a front cylinder head of a front cylinder and a rear cylinder head of a rear cylinder, the cooling structure comprising: a fluid circuit defined at least partially by a front cylinder precision cooling tube through which a cooling medium/coolant liquid flows to provide precision cooling to the front cylinder head, and a rear cylinder precision cooling tube, fluidically connected to the front cylinder precision cooling tube, through which a cooling medium/coolant liquid flows to provide precision cooling to the rear cylinder head, the front cylinder precision cooling tube and the rear cylinder precision cooling tube being fluidically connected in series, wherein the front cylinder precision cooling tube has one section thereof formed having a serpentine shape that extends between exhaust port legs of the front cylinder to provide precision cooling thereto.

Clause 4. A coolant circuit for a vehicle engine having a front cylinder head of a front cylinder and a rear cylinder head of a rear cylinder, the cooling structure comprising: a fluid circuit defined at least partially by a front cylinder precision cooling tube through which a cooling medium/coolant liquid flows to provide precision cooling to the front cylinder head, and a rear cylinder precision cooling tube, fluidically connected to the front cylinder precision cooling tube, through which a cooling medium/coolant liquid flows to provide precision cooling to the rear cylinder head, the front cylinder precision cooling tube and the rear cylinder precision cooling tube being fluidically connected in series, wherein the rear cylinder precision cooling tube has one section thereof formed having a serpentine shape that extends between exhaust port legs of the rear cylinder to provide precision cooling thereto.

Clause 5. A liquid cooling system for a vehicle engine having a front cylinder head of a front cylinder and a rear cylinder head of a rear cylinder, the liquid cooling system comprising: a plurality of cooling tubes fluidically connected in series defining a channel through which a cooling medium/coolant liquid is to flow, the cooling tubes including a front cylinder precision cooling tube, a rear cylinder precision cooling tube, and an intermediate transfer hose to fluidically connect the front cylinder precision cooling tube and the rear cylinder precision cooling tube, wherein the front cylinder precision cooling tube has one section thereof formed having a serpentine shape that extends between exhaust port legs of the front cylinder to provide precision cooling thereto, and the rear cylinder precision cooling tube has one section thereof formed having a serpentine shape that extends between exhaust port legs of the rear cylinder to provide precision cooling thereto.

Clause 6. A liquid cooling system for a vehicle engine having a front cylinder head of a front cylinder and a rear cylinder head of a rear cylinder, the liquid cooling system comprising: a fluid circuit that includes a plurality of cooling tubes fluidically connected in series defining a channel through which a cooling medium/coolant liquid is to flow, a radiator operable to cool the cooling medium, and a pump for driving the cooling medium through the fluid circuit, wherein the cooling tubes include a front cylinder precision cooling tube operable to provide precision cooling to the front cylinder head, and a rear cylinder precision cooling tube fluidically connected to the front cylinder precision cooling tube to provide precision cooling to the rear cylinder head, wherein the front cylinder precision cooling tube, in a flow direction of the fluid circuit, is arranged downstream of the rear cylinder precision cooling tube in a manner such that the cooling medium is circulated first to the rear cylinder head before flowing to the front cylinder head.

Clause 7. A liquid cooling system for a vehicle engine having a front cylinder head of a front cylinder and a rear cylinder head of a rear cylinder, the liquid cooling system comprising: a front cylinder precision cooling tube through which a cooling medium/coolant liquid flows to provide precision cooling to the front cylinder head; a rear cylinder precision cooling tube, fluidically connected to the front cylinder precision cooling tube, through which a cooling medium/coolant liquid flows to provide precision cooling to the rear cylinder head; a radiator operable to cool the cooling medium; and a pump for driving the cooling medium through a fluid circuit defined by the front cylinder precision cooling tube, the rear cylinder precision cooling tube, and the radiator.

Clause 8. A liquid cooling system for a vehicle engine having a front cylinder head of a front cylinder and a rear cylinder head of a rear cylinder, the liquid cooling system comprising: a front cylinder precision cooling tube through which a cooling medium/coolant liquid flows to provide precision cooling to the front cylinder head; a rear cylinder precision cooling tube, fluidically connected to the front cylinder precision cooling tube, through which a cooling medium/coolant liquid flows to provide precision cooling to the rear cylinder head, the front cylinder precision cooling tube and the rear cylinder precision cooling tube being connected in series; a radiator operable to cool the cooling medium; and a pump for driving the cooling medium through a fluid circuit defined by the front cylinder precision cooling tube, the rear cylinder precision cooling tube, and the radiator, wherein the front cylinder precision cooling tube has one section thereof formed having a serpentine shape that extends between exhaust port legs of the front cylinder to provide precision cooling thereto, wherein the rear cylinder precision cooling tube has one section thereof formed having a serpentine shape that extends between exhaust port legs of the rear cylinder to provide precision cooling thereto.

Clause 9. A liquid cooling system for a vehicle engine having a front cylinder head of a front cylinder and a rear cylinder head of a rear cylinder, the liquid cooling system comprising: a front cylinder precision cooling tube through which a cooling medium/coolant liquid flows to provide precision cooling to the front cylinder head; a rear cylinder precision cooling tube, fluidically connected to the front cylinder precision cooling tube, through which a cooling medium/coolant liquid flows to provide precision cooling to the rear cylinder head, the front cylinder precision cooling tube and the rear cylinder precision cooling tube being connected in series; a radiator operable to cool the cooling medium; and a pump for driving the cooling medium through a fluid circuit defined by the front cylinder precision cooling tube, the rear cylinder precision cooling tube, and the radiator, wherein the front cylinder precision cooling tube, in a flow direction of the fluid circuit, is arranged downstream of the rear cylinder precision cooling tube in a manner such that the cooling medium is circulated first to the rear cylinder head before flowing to the front cylinder head.

Clause 10. A method of cooling a vehicle engine having a front cylinder head of a front cylinder and a rear cylinder head of a rear cylinder, the method comprising: providing a fluid circuit defined at least in part by a front cylinder precision cooling tube and a rear cylinder precision cooling tube in a manner such that a cooling medium/coolant liquid is circulated temporally first to the rear cylinder head.

Clause 11. A method of cooling a vehicle engine having a front cylinder head of a front cylinder and a rear cylinder head of a rear cylinder, the method comprising: circulating a cooling medium/coolant liquid through a fluid circuit defined at least in part by a front cylinder precision cooling tube and a rear cylinder precision cooling tube in a manner such that the cooling medium/coolant liquid is circulated temporally first to the rear cylinder head.

Clause 12. A method of cooling a vehicle engine having a front cylinder head of a front cylinder and a rear cylinder head of a rear cylinder, the method comprising: fluidically connecting in series a front cylinder precision cooling tube and a rear cylinder precision cooling tube, the front cylinder precision cooling tube having one section thereof formed having a serpentine shape that extends between exhaust port legs of the front cylinder, and the rear cylinder precision cooling tube has one section thereof formed having a serpentine shape that extends between exhaust port legs of the rear cylinder to provide precision cooling thereto, circulating a cooling medium/coolant liquid through the rear cylinder precision cooling tube to provide precision cooling to the exhaust port legs of the rear cylinder.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle system comprising:
a vehicle engine having a front cylinder head and a rear cylinder head with a pair of rear exhaust ports that are spaced apart to define a gap; and
a liquid cooling system for thermal management of the vehicle engine, the liquid cooling system having a coolant circuit including one or more cooling tubes fluidically connected in series to define a channel for circulation of a cooling medium to cool the front cylinder head and the rear cylinder head, the cooling tubes including a rear cylinder precision cooling tube having a serpentine shape that extends through the gap between the pair of rear exhaust ports to thermally contact one or more heat exchange surfaces of the rear exhaust ports.

2. The vehicle system of claim 1, wherein the coolant circuit is configured to circulate the cooling medium to the rear cylinder head temporally before circulating the cooling medium to the front cylinder head.

3. The vehicle system of claim 1, wherein the serpentine shape of the rear cylinder precision cooling tube comprises a first zone configured to thermally contact one or more heat exchange surfaces of a first rear exhaust port of the rear exhaust ports.

4. The vehicle system of claim 3, wherein the serpentine shape of the rear cylinder precision cooling tube comprises a second zone oriented in an opposite direction than the first zone.

5. The vehicle system of claim 4, wherein the second zone is configured to thermally contact one or more heat exchange surfaces of a second rear exhaust port of the rear exhaust ports.

6. The vehicle system of claim 5, wherein the serpentine shape of the rear cylinder precision cooling tube comprises a third zone that extends between the first zone and the second zone and into the gap between the first rear exhaust port and the second rear exhaust port.

7. The vehicle system of claim 6, wherein the third zone is configured to thermally contact one or more heat exchange surfaces of the first rear exhaust port and the second rear exhaust port.

8. A vehicle, comprising:
a vehicle structure;
a vehicle engine mounted on the vehicle structure, the vehicle engine including a front cylinder head of a front cylinder and a rear cylinder head of a rear cylinder having a pair of rear exhaust ports; and
a liquid cooling system having a coolant circuit including one or more cooling tubes fluidically connected in series to define a channel for circulation of a cooling medium to cool the front cylinder head and the rear cylinder head, the cooling tubes including a rear cylinder precision cooling tube having a serpentine shape that extends through a gap between the rear exhaust ports to thermally contact one or more heat exchange surfaces of the rear exhaust ports.

9. The vehicle of claim 8, wherein the coolant circuit is configured to circulate the cooling medium to the rear cylinder head temporally before circulating the cooling medium to the front cylinder head.

10. The vehicle of claim 8, wherein the serpentine shape of the rear cylinder precision cooling tube comprises a first zone configured to thermally contact one or more heat exchange surfaces of a first rear exhaust port of the rear exhaust ports.

11. The vehicle of claim 10, wherein the serpentine shape of the rear cylinder precision cooling tube comprises a second zone oriented in an opposite direction than the first zone.

12. The vehicle of claim 11, wherein the second zone is configured to thermally contact one or more heat exchange surfaces of a second rear exhaust port of the rear exhaust ports.

13. The vehicle of claim 12, wherein the serpentine shape of the rear cylinder precision cooling tube comprises a third zone that extends between the first zone and the second zone and into a gap between the first rear exhaust port and the second rear exhaust port.

14. The vehicle of claim 13, wherein the third zone configured to thermally contact one or more heat exchange surfaces of the first rear exhaust port and the second rear exhaust port.

15. The vehicle of claim 8, further comprising a heat exchanger that is center-mounted on the vehicle structure at a predetermined angle and configured to transmit heated absorbed from the cooling medium to the ambient environment outside of the vehicle.

16. The vehicle of claim 15, wherein the predetermined angle is 21.1 degrees.

17. The vehicle of claim 15, further comprising a pump fluidically connected at one end thereof to the heat exchanger and an opposite end thereof to the rear cylinder precision cooling tube to drive the cooling medium to the rear cylinder head temporally before being circulated to the front cylinder head.

18. A vehicle engine, comprising:

a front cylinder head and a rear cylinder head with a pair of rear exhaust ports that are spaced apart to define a gap; and a coolant circuit for thermal management of the vehicle engine, the coolant circuit having one or more cooling tubes fluidically connected in series to define a channel for circulation of a cooling medium to cool the front cylinder head and the rear cylinder head, the cooling tubes including a rear cylinder precision cooling tube having a serpentine shape that extends through the gap between the pair of rear exhaust ports to thermally contact one or more heat exchange surfaces of the rear exhaust ports.

19. The vehicle engine of claim 18, wherein the serpentine shape of the rear cylinder precision cooling tube comprises:

a first zone configured to thermally contact one or more heat exchange surfaces of a first rear exhaust port of the rear exhaust ports, a second zone oriented in an opposite direction than the first zone, and a third zone that extends between the first zone and the second zone and into the gap between the first rear exhaust port and the second rear exhaust port.

20. The vehicle engine of claim 19, wherein:

the second zone is configured to thermally contact one or more heat exchange surfaces of a second rear exhaust port of the rear exhaust ports, and the third zone is configured to thermally contact one or more heat exchange surfaces of the first rear exhaust port and the second rear exhaust port.

* * * * *